United States Patent
Higashiyama

(10) Patent No.: US 9,340,089 B2
(45) Date of Patent: May 17, 2016

(54) COOLING UNIT OF AIR CONDITIONING APPARATUS FOR VEHICLE

(75) Inventor: Naohisa Higashiyama, Oyama (JP)

(73) Assignee: Keihin Thermal Technology Corporation, Oyama-shi (JP)

( * ) Notice: Subject to any disclaimer, the term of this patent is extended or adjusted under 35 U.S.C. 154(b) by 554 days.

(21) Appl. No.: 13/611,283

(22) Filed: Sep. 12, 2012

(65) Prior Publication Data
US 2013/0067946 A1 Mar. 21, 2013

(30) Foreign Application Priority Data
Sep. 15, 2011 (JP) ................. 2011-201328

(51) Int. Cl.
*B60H 1/00* (2006.01)
*F25B 39/02* (2006.01)

(52) U.S. Cl.
CPC ............ *B60H 1/00335* (2013.01); *B60H 1/005* (2013.01); *F25B 39/02* (2013.01)

(58) Field of Classification Search
CPC ........................... B60H 1/00335; B60H 1/005
USPC ..................... 62/285, 288, 524, 515
See application file for complete search history.

(56) References Cited

U.S. PATENT DOCUMENTS

| | | | | |
|---|---|---|---|---|
| 5,481,886 A | * | 1/1996 | Hasegawa ............... | F24F 13/22 165/913 |
| 2004/0093889 A1 | | 5/2004 | Bureau et al. | |
| 2009/0151384 A1 | | 6/2009 | Lee | |
| 2009/0282850 A1 | * | 11/2009 | Higashiyama ......... | F25B 39/02 62/239 |

FOREIGN PATENT DOCUMENTS

| | | | |
|---|---|---|---|
| JP | 3287100 B2 | | 7/1995 |
| JP | 4043776 B2 | | 9/2002 |
| JP | 2005-3259 A | | 1/2005 |
| JP | 2007-1510 A | | 1/2007 |
| JP | 2007001510 A | * | 1/2007 |
| JP | 2008-18905 A | | 1/2008 |
| JP | 2010-203748 A | | 9/2010 |
| JP | 2010203748 A | * | 9/2010 |
| JP | 2010-243065 A | | 10/2010 |
| JP | 2010261658 A | * | 11/2010 |
| JP | 2011-133182 A | | 7/2011 |
| WO | WO 2010074016 A1 | * | 7/2010 ............... F28D 1/03 |

OTHER PUBLICATIONS

Notice of Reasons for Rejection mailed on Jun. 2, 2015 issued for corresponding Japanese Patent Application No. 2011-201328.

* cited by examiner

*Primary Examiner* — Emmanuel Duke
(74) *Attorney, Agent, or Firm* — Locke Lord LLP

(57) ABSTRACT

A cooling unit includes an evaporator with a cool storage function, and a drain case disposed below the evaporator. Cool storage material containers and outer fins of the evaporator have respective outward projecting portions which project from the refrigerant flow tubes toward the leeward side. The drain case includes a condensed water drain portion which drains condensed water generated on the evaporator from at least one of the lower end of the outward projecting portion of each cool storage material container and the lower end of the outward projecting portion of each outer fin. The cooling unit is preferably used in a refrigeration cycle which constitutes an air conditioning apparatus for a vehicle in which an engine serving as a drive source for a compressor is temporarily stopped when the vehicle is stopped.

2 Claims, 3 Drawing Sheets

COOLING UNIT OF AIR CONDITIONING APPARATUS FOR VEHICLE

BACKGROUND OF THE INVENTION

The present invention relates to a cooling unit used in an air conditioning apparatus for a vehicle in which an engine serving as a drive source for a compressor is temporarily stopped when the vehicle is stopped.

In the present specification and appended claims, the upper and lower sides of FIGS. 1 and 3 will be referred to as "upper" and "lower," respectively.

Also, in the present specification and appended claims, the term "condenser" encompasses not only an ordinary condenser but also a sub-cooling condenser having a condensing section and a subcooling section.

In recent years, in order to protect the environment and improve fuel consumption of automobiles, there has been proposed an automobile designed to automatically stop the engine when the automobile stops, for example, so as to wait for a traffic light to change.

However, an ordinary air conditioning apparatus has a problem in that, when the engine of a vehicle in which the air conditioning apparatus is mounted is stopped, a compressor driven by the engine stops, and supply of refrigerant to an evaporator stops, whereby the cooling capacity of the air conditioning apparatus sharply drops.

One conceivable measure for solving such a problem is imparting a cool storage function to the evaporator, to thereby enable cooling of a vehicle compartment by releasing the cool stored in the evaporator, when the compressor stops as a result of stoppage of the engine.

Such an evaporator with a cool storage function has been proposed (see Japanese Patent No. 4043776). The proposed evaporator includes upper and lower header tanks spaced from each other in the vertical direction, and a heat exchange core section provided between the two header tanks. The heat exchange core section includes a plurality of flat refrigerant flow tubes which are disposed such that they are spaced from one another in the longitudinal direction of the two header tank, their width direction coincides with an air-passing direction, and their longitudinal direction coincides with the vertical direction. Upper and lower end portions of the refrigerant flow tubes communicate with the upper and lower header tanks, respectively. The heat exchange core section also includes cool storage material containers which are disposed in at least some of a plurality of air-passing clearances, each formed between adjacent refrigerant flow tubes, such that their width direction coincides with the air-passing direction, and their longitudinal direction coincides with the vertical direction. The cool storage material containers are filled with a cool storage material. The cool storage material within the cool storage material containers is cooled by the cool carried by the refrigerant flowing through the refrigerant flow tubes. As in the case of an ordinary evaporator, the evaporator with a cool storage function disclosed in the patent publication is used as a cooling unit of an air conditioning apparatus for a vehicle in a state in which the lower header tank is fitted into a drain case which receives condensed water generated on the evaporator (see, for example, Japanese Patent No. 3287100).

An air conditioning apparatus for a vehicle which includes an evaporator with a cool storage function disclosed in Japanese Patent No. 4043776 operates as follows. In an ordinary cooling period in which a compressor is operating, the cool carried by the refrigerant flowing through the refrigerant flow tubes is transferred to the cool storage material within the cool storage material containers, and is stored in the cool storage material. When the compressor stops, the cool stored in the cool storage material within the cool storage material containers is released to air passing through the heat exchange core section via the refrigerant flow tubes with which the cool storage material containers are thermally contacted.

Incidentally, the air conditioning apparatus for a vehicle which includes an evaporator with a cool storage function disclosed in Japanese Patent No. 4043776 has been recently required to more effectively reduce a drop in cooling performance at the time when the compressor stops.

In order to meet such a demand, the present applicant has proposed an evaporator with a cool storage function which can more effectively reduce a drop in cooling performance at the time when the compressor stops. Specifically, the present applicant has proposed an evaporator with a cool storage function as disclosed in Japanese Patent No. 4043776 wherein each of the cool storage material containers has a container main body portion joined to corresponding refrigerant flow tubes, and an outward projecting portion which is provided such that it extends from the leeward side edge portion of the container main body portion and projects from the refrigerant flow tubes toward the leeward side (see Japanese Patent Application Laid-Open (kokai) No. 2010-203748).

However, when the evaporator with a cool storage function disclosed in the Japanese Patent Application Laid-Open No. 2010-203748 is used as a cooling unit of an air conditioning apparatus for a vehicle, a problem arises. Specifically, even when the lower header tank of the evaporator is fitted into a drain case for receiving condensed water, the drain case may fail to efficiently drain condensed water generated on the outward projecting portions of the cool storage material containers.

SUMMARY OF THE INVENTION

An object of the present invention is to provide a cooling unit of an air conditioning apparatus for a vehicle which can effectively suppress a drop in cooling performance at the time when a compressor stops and which can efficiently drain condensed water generated on cool storage material containers.

To fulfill the above object, the present invention comprises the following modes.

1) A cooling unit of an air conditioning apparatus for a vehicle which comprises an evaporator with a cool storage function, and a drain case disposed below the evaporator, the evaporator including a plurality of refrigerant flow tubes disposed such that their longitudinal direction coincides with a vertical direction and they are spaced from one another, cool storage material containers which are disposed at least some of a plurality of air-passing clearances each formed between adjacent refrigerant flow tubes and which are filled with a cool storage material, and outer fins which are disposed in the remaining air-passing clearances in which the cool storage material containers are not disposed, wherein the cool storage material containers and outer fins of the evaporator have respective outward projecting portions which project from the refrigerant flow tubes toward a leeward side; and the drain case includes a condensed water drain portion which drains condensed water generated on the evaporator from at least one of a lower end of the outward projecting portion of each cool storage material container and a lower end of the outward projecting portion of each outer fin.

2) A cooling unit of an air conditioning apparatus for a vehicle according to par. 1), wherein the condensed water drain portion has a drawing portion which is in contact with or is in close proximity to at least one of the lower end of the outward projecting portion of each cool storage material container and the lower end of the outward projecting portion of each outer fin and which draws condensed water from the at least one of the lower end of the outward projecting portion of each cool storage material container and the lower end of the outward projecting portion of each outer fin.

3) A cooling unit of an air conditioning apparatus for a vehicle according to par. 2), wherein an elastic member is provided at a distal end of the drawing portion of the condensed water drain portion, and the elastic member is in contact with the at least one of the lower end of the outward projecting portion of each cool storage material container and the lower end of the outward projecting portion of each outer fin.

4) A cooling unit of an air conditioning apparatus for a vehicle according to par. 2), wherein a gap is provided between a distal end of the drawing portion of the condensed water drain portion and the lower end of the outward projecting portion of each cool storage material container, a gap is provided between the distal end of the drawing portion and the lower end of the outward projecting portion of each outer fin, and the size of the gaps as measured in the vertical direction is 3 mm or less.

5) A cooling unit of an air conditioning apparatus for a vehicle according to par. 2), wherein the condensed water drain portion includes a leeward projecting portion provided on an outer surface of the drain case, which surface faces the leeward side and an upward projecting portion provided on the leeward projecting portion, drain holes in the form of through holes are formed in the leeward projecting portion, and the upward projecting portion serves as the drawing portion.

6) A cooling unit of an air conditioning apparatus for a vehicle according to par. 5), wherein the evaporator with a cool storage function includes upper and lower header tanks which are spaced from each other in the vertical direction and to which upper and lower ends of the refrigerant flow tubes are connected, respectively; the drain case includes a case main body which has leeward-side and windward-side side walls and a bottom wall connecting lower end portions of the two side walls together and into which the lower header tank is fitted; the case main body is adapted to drain condensed water dropping from the lower header tank; and the condensed water drain portion is provided on an outer surface of the leeward-side side wall of the case main body.

7) An air conditioning apparatus which comprises a compressor, a condenser, a pressure reducing unit, and a cooling unit according to par. 1) and which is used in a vehicle in which an engine serving as a drive source for the compressor is temporarily stopped when the vehicle is stopped.

According to the cleaning unit of any one of pars. 1) to 6), the cool storage material containers and outer fins of the evaporator with a cool storage function have respective outward projecting portions which project from the refrigerant flow tubes toward the leeward side. Thus, the amount of the cool storage material which can be charged in a single cool storage material container can be increased by an amount corresponding to the volume of the outward projecting portion, as compared with the cool storage material containers of the evaporator with a cool storage function disclosed in Japanese Patent No. 4043776. Accordingly, even when the amount of the cool storage material charged into the cool storage material containers is increased without changing the dimensions of the heat exchange core section, it is unnecessary to increase the number of the cool storage material containers or entirely increase the height of all the cool storage material containers. Therefore, a decrease in the area of the air-passing clearances through which air passes can be suppressed as compared with the evaporator with a cool storage function disclosed in Japanese Patent No. 4043776, and an increase in air passage resistance can be suppressed. In addition, the drain case includes a condensed water drain portion which drains condensed water generated on the evaporator from at least one of the lower end of the outward projecting portion of each cool storage material container and the lower end of the outward projecting portion of each outer fin. Therefore, condensed water generated on the outward projecting portions of the cool storage material containers and the outer fins can be drained efficiently. According to the cooling unit according to any one of pars. 2) to 6), the condensed water drain portion has a drawing portion which is in contact with or is in close proximity to at least one of the lower end of the outward projecting portion of each cool storage material container and the lower end of the outward projecting portion of each outer fin and which draws condensed water from the at least one of the lower end of the outward projecting portion of each cool storage material container and the lower end of the outward projecting portion of each outer fin. Therefore, condensed water generated on the outward projecting portion of each cool storage material container and the outward projecting portion of each outer fin flows downward and reaches the lower end of the outward projecting portion of each cool storage material container and the lower end of the outward projecting portion of each outer fin. Subsequently, by the capillary effect, the condensed water is guided to the drawing portion, and is drained from the condensed water drain portion. Accordingly, the condensed water generated on the outward projecting portions of the cool storage material containers and the outward projecting portions of the outer fins can be drained efficiently.

The air conditioning apparatus for a vehicle according to par. 7) provides advantageous effects similar to those described in relation to the cooling units of pars. 1) to 6).

DESCRIPTION OF THE PREFERRED EMBODIMENT

An embodiment of the present invention will next be described with reference to the drawings.

In the following description, the downstream side with respect to an air-passing direction (a direction represented by arrow X in FIGS. 1 to 3) will be referred to as the "front," and the opposite side as the "rear." Also, the left-hand and right-hand sides as viewed from the front side toward the rear side; i.e., the left-hand and right-hand sides of FIG. 1 will be referred to as "left" and "right," respectively.

Furthermore, the term "aluminum" as used in the following description encompasses aluminum alloys in addition to pure aluminum.

Figure 1:
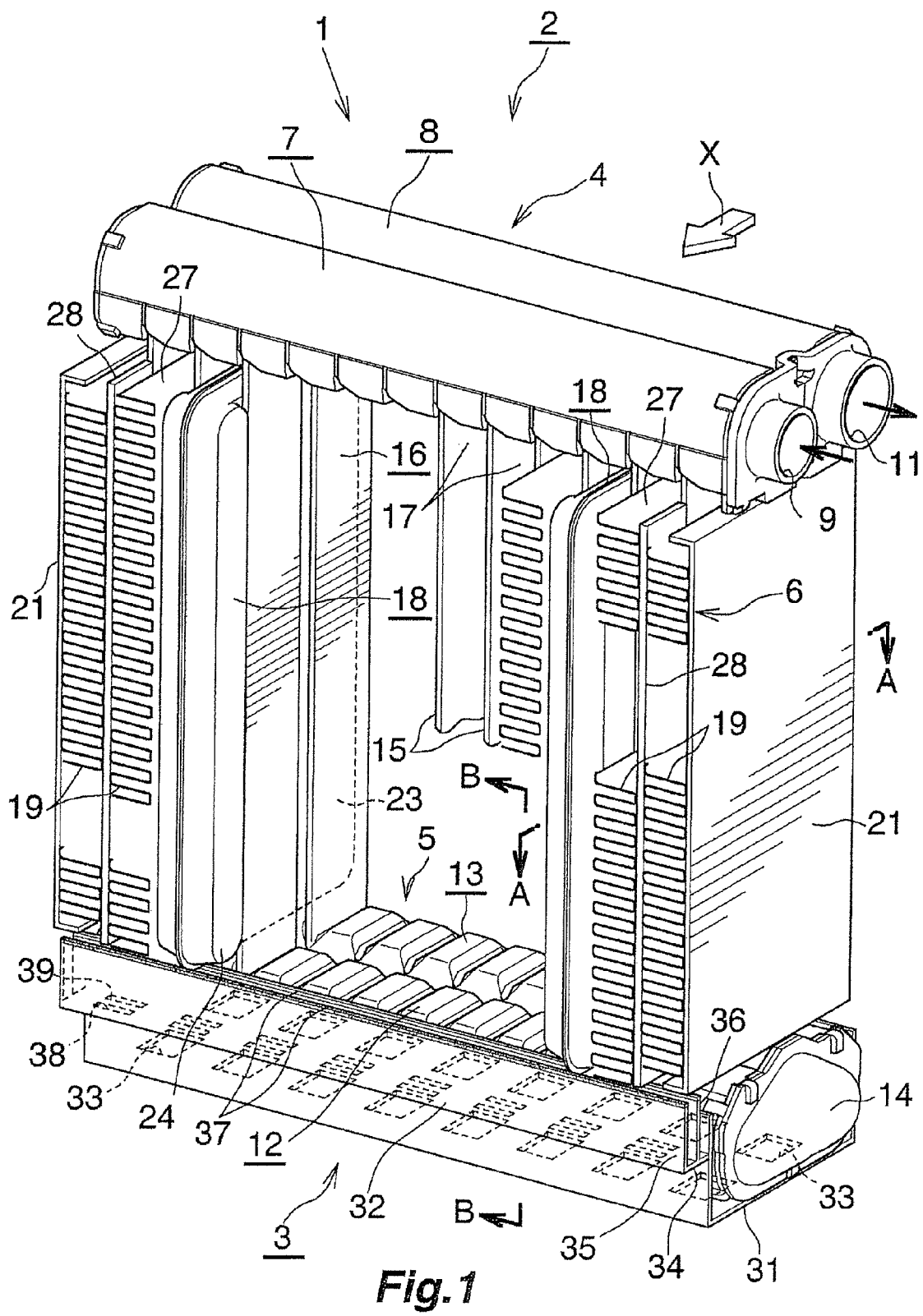
FIG. 1 is a partially cut-away perspective view showing the overall structure of a cooling unit of an air conditioning apparatus for a vehicle.
Figure 2:
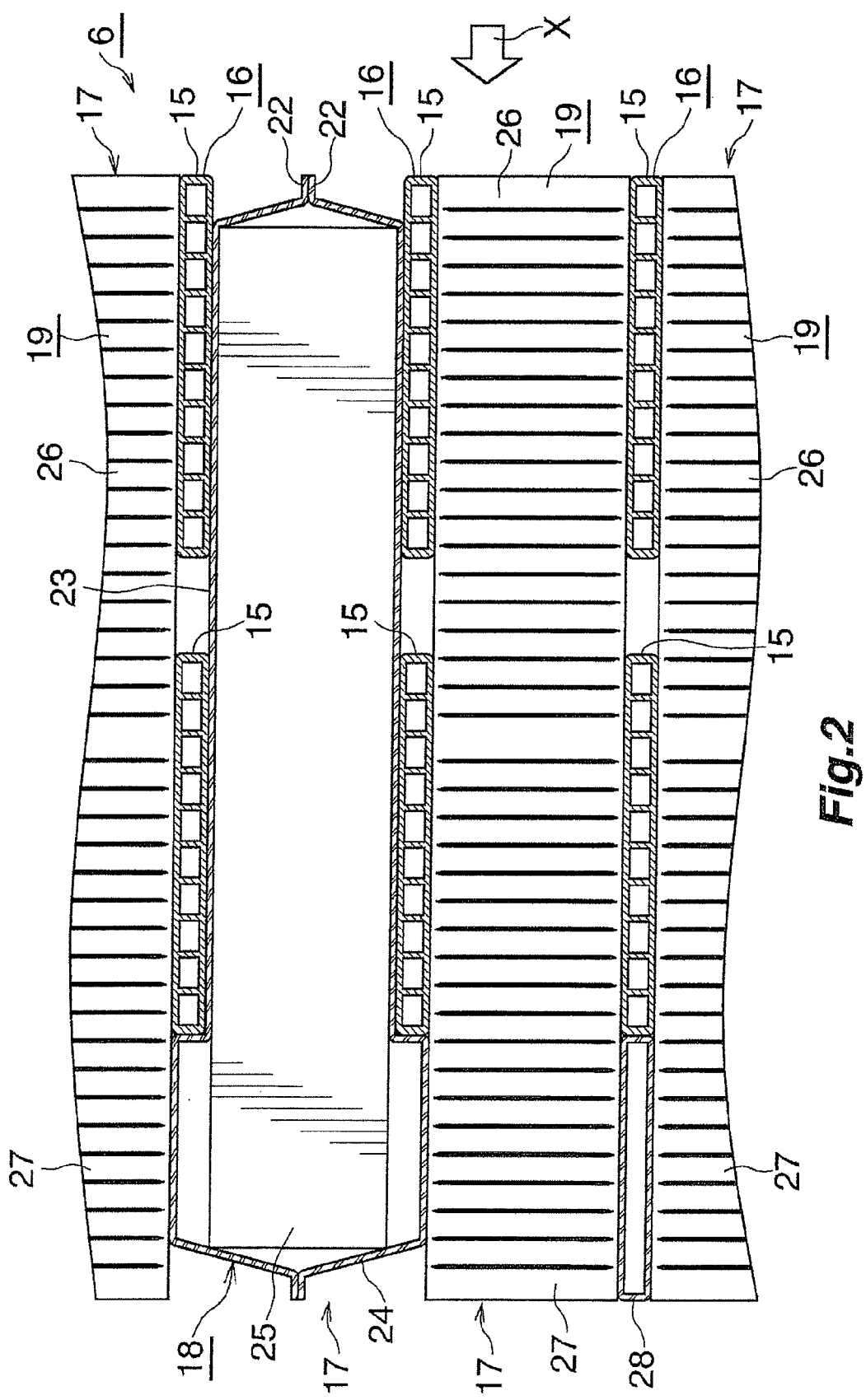
FIG. 2 is an enlarged sectional view taken along line A-A of FIG. 1.
Figure 3:
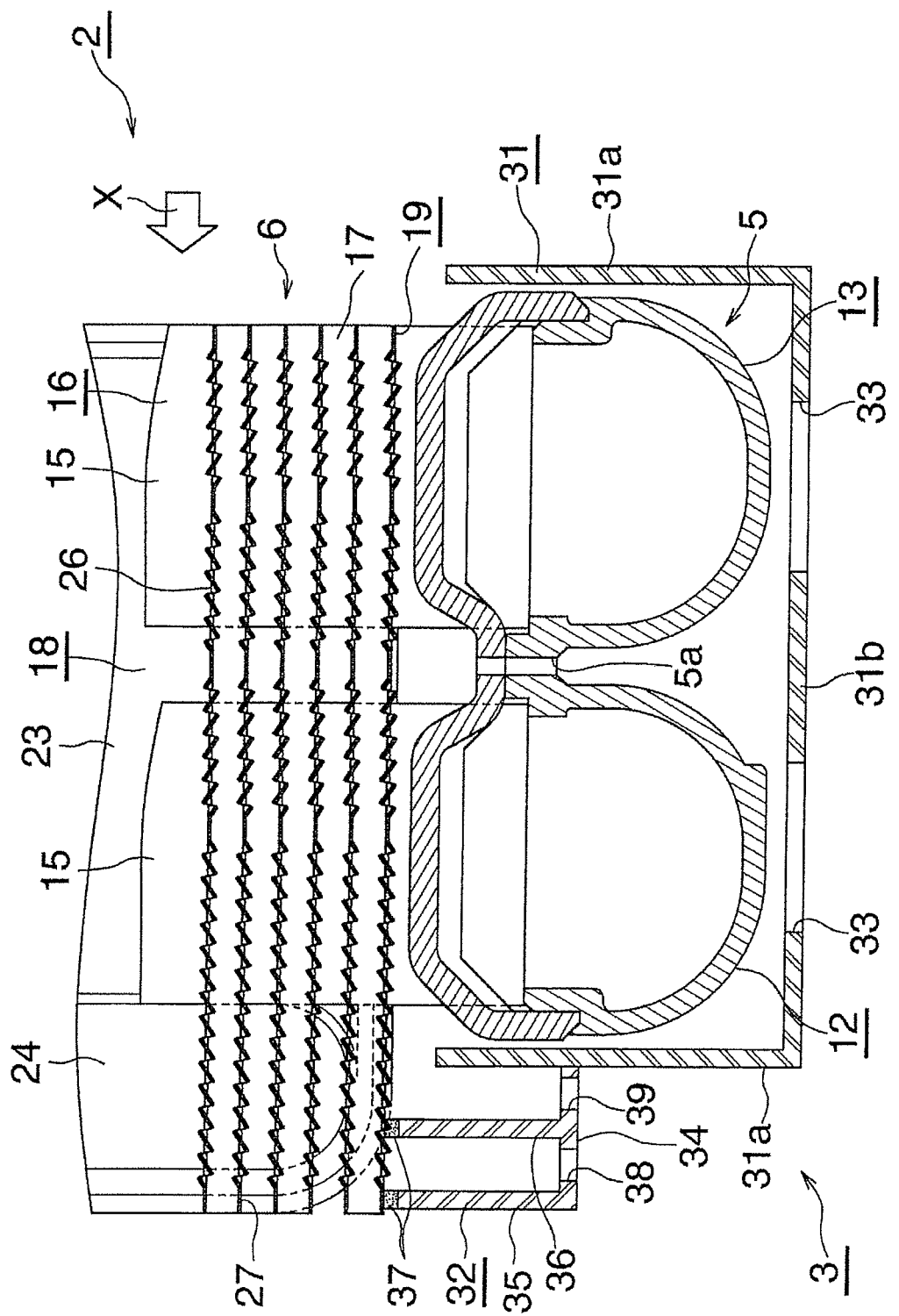
FIG. 3 is an enlarged sectional view taken along line B-B of FIG. 1.

FIG. 1 shows the overall configuration of a cooling unit used in an air conditioning apparatus for a vehicle in which an engine serving as a drive source for a compressor is temporarily stopped when the vehicle is stopped. FIGS. 2 and 3 show an essential portion of the cooling unit of FIG. 1.

As shown in FIG. 1, a cooling unit 1, which is used in an air conditioning apparatus for a vehicle in which an engine serving as a drive source for a compressor is temporarily stopped when the vehicle is stopped, includes an evaporator 2 with a cool storage function, and a drain case 3 disposed below the evaporator 2 and adapted to drain condensed water generated on the evaporator 2.

The evaporator 2 includes a first header tank 4 and a second header tank 5 formed of aluminum and disposed apart from each other in the vertical direction such that they extend in the left-right direction; and a heat exchange core section 6 provided between the two header tanks 4 and 5.

The first header tank 4 includes a leeward upper header section 7 located on the front side (downstream side with respect to the air-passing direction); and a windward upper header section 8 located on the rear side (upstream side with respect to the air-passing direction) and united with the leeward upper header section 7. A refrigerant inlet 9 is provided at the right end of the leeward upper header section 7, and a refrigerant outlet 11 is provided at the right end of the windward upper header section 8. The second header tank 5 includes a leeward lower header section 12 located on the front side, and a windward lower header section 13 located on the rear side and united with the leeward lower header section 12. The respective interiors of the leeward lower header section 12 and the windward lower header section 13 of the second header tank 5 are connected together via a communication member 14 which is joined to the right ends of the two lower header sections 12 and 13 and which has an inner space serving as a passage. Vertically extending drain grooves (not shown) are formed on the front and rear side surfaces of the second header tank 5, and drain holes (through holes) 5a are formed between the two lower header sections 12 and 13 (see FIG. 3). Also, although not illustrated, the second header tank 5 has guide portions which guide condensed water dropped on the second header tank 5 to the drain grooves and the drain holes 5a.

As shown in FIGS. 1 and 2, in the heat exchange core section 6, a plurality of flat refrigerant flow tubes 15 which extend in the vertical direction, whose width direction coincides with the air-passing direction (the front-rear direction), and which are formed of aluminum extrudate are disposed in parallel such that they are spaced from one another in the left-right direction. In the present embodiment, a plurality of pairs 16 each composed of two refrigerant flow tubes 15 spaced from each other in the front-rear direction are disposed at predetermined intervals in the left-right direction. Air-passing clearances 17 are formed such that each air-passing clearance 17 is formed between adjacent two of the pairs 16 each composed of the front and rear refrigerant flow tubes 15. An upper end portion of each front refrigerant flow tube 15 is connected to the leeward upper header section 7, and a lower end portion of each front refrigerant flow tube 15 is connected to the leeward lower header section 12. Similarly, an upper end portion of each rear refrigerant flow tube 15 is connected to the windward upper header section 8, and a lower end portion of each rear refrigerant flow tube 15 is connected to the windward lower header section 13.

A cool storage material container 18 which is formed of aluminum and which is filled with a cool storage material (not shown) is disposed in each of air-passing clearances 17 selected from all the air-passing clearances 17 of the heat exchange core section 6, the selected air-passing clearances 17 being not adjacent from one another, such that the cool storage material container 18 extends over the front and rear refrigerant flow tubes 15. Also, a corrugated outer fin 19 is disposed in each of the remaining air-passing clearances 17 such that the corrugated outer fin 19 extends over the front and rear refrigerant flow tubes 15. The corrugated outer fin 19 is formed from an aluminum brazing sheet having a brazing material layer on each of opposite surfaces thereof and which has crest portions extending in the front-rear direction, trough portions extending in the front-rear direction, and connection portions connecting the crest portions and the trough portions. The corrugated outer fin 19 is brazed to the front and rear refrigerant flow tubes 15 of the left-side and right-side pairs 16 which define the air-passing clearance 17 in which the outer fin 19 is disposed. That is, the outer fin 19 is disposed in each of the air-passing clearances 17 located on both sides of the air-passing clearance 17 in which the cool storage material container 18 is disposed. Also, the outer fin 19, which is formed from an aluminum brazing sheet having a brazing material layer on each of opposite surfaces thereof, is disposed on the outer side of the pair 16 of the refrigerant flow tubes 15 located at the left end, and is disposed on the outer side of the pair 16 of the refrigerant flow tubes 15 located at the right end. These outer fins 19 are brazed to the corresponding front and rear refrigerant flow tubes 15. Furthermore, a side plate 21 formed of aluminum is disposed on the outer side of each of the outer fins 19 located at the left and right ends, respectively, and is brazed to the corresponding outer fin 19. The spaces between the outer fins 19 and the side plates 21 located at the left and right ends also serve as air-passing clearances.

Each cool storage material container 18 is a flat container whose width direction coincides with the front-rear direction, and is formed by brazing together circumferential edge portions of two generally rectangular aluminum plates 22 extending vertically. Each cool storage material container 18 has a container main body portion 23 and an outward projecting portion 24. The container main body portion 23 is located rearward of the front side edges of the front refrigerant flow tubes 15, and is brazed to the two (front and rear) refrigerant flow tubes 15 of each of the pairs 16 located on opposite sides of the container main body portion 23. The outward projecting portion 24 extends from the front side edge (leeward side edge) of the container main body portion 23, and projects frontward (outward in the air-passing direction) from the front side edges of the front refrigerant flow tubes 15. The entire container main body portion 23 of the cool storage material container 18 has a uniform dimension as measured in the left-right direction. The dimension of the outward projecting portion 24 of the cool storage material container 18 as measured in the vertical direction is equal to that of the container main body portion 23, and the dimension of the outward projecting portion 24 of the cool storage material container 18 as measured in the left-right direction is greater than that of the container main body portion 23 of the cool storage material container 18. Therefore, in relation to the container main body portion 23, the outward projecting portion 24 bulges outward in the left-right direction. The dimension of the outward projecting portion 24 as measured in the left-right direction is equal to a height obtained by adding the dimension of the container main body portion 23 of the cool storage material container 18 in the left-right direction to the double of a tube height, which is the dimension of each refrigerant flow tube 15 as measured in the left-right direction.

An inner fin 25 made of aluminum is disposed in each cool storage material container 18 such that the inner fin 25 extends from the rear end of the container main body portion 23 to the front end of the outward projecting portion 24 and extends over substantially the entire length of the cool storage material container 18 in the vertical direction. The inner fin 25 is a corrugated fin which has crest portions extending in the front-rear direction, trough portions extending in the front-rear direction, and connection portions connecting the crest portions and the trough portions. The inner fin 25 has a uniform fin height over the entirety thereof, and is brazed to the inner surfaces of the left and right side walls of the container main body portion 23 of the storage material container 18.

A paraffin-based latent heat storage material having an adjusted freezing point of about 5 to 10° C. is used as a cool storage material charged into each cool storage material container 18. Specifically, pentadecane, tetradecane, or the like is used. The cool storage material is charged into each cool storage material container 18 such that the cool storage material reaches a point near the upper end of the cool storage material container 18. Notably, the cool storage material container 18 is designed to have a sufficient strength within a usual temperature range of an environment in which the cooling unit is used; for example, a temperature range of –40° C. to 90° C., such that, even when the internal pressure increases due to density change of the cool storage material in a liquid phase and thermal expansion of air remaining within the cool storage material container 18, the cool storage material container 18 does not break.

Each outer fin 19 has a fin main body portion 26 and an outward projecting portion 27. The fin main body portion 26 is located rearward of the front side edges of the front refrigerant flow tubes 15, and is brazed to the front and rear refrigerant flow tubes 15 of each of the pairs 16 located on opposite sides of the fin main body portion 26. The outward projecting portion 27 extends from the front side edge of the fin main body portion 26, and projects frontward from the front side edges of the front refrigerant flow tubes 15. The lower ends of the outer fins 19 are located at a vertical position which is the same as or close to the vertical position of the lower ends of the cool storage material containers 18. The outward projecting portions 27 of the outer fins 19 disposed in the air-passing clearances 17 adjacently located on the opposite sides of the air-passing clearances 17 in which the cool storage material container 18 is disposed are brazed to the left and right side surfaces of the outward projecting portion 24 of the cool storage material container 18. Also, a spacer 28 formed of aluminum is disposed between the outward projecting portions 27 of the adjacent outer fins 19, and is brazed to the outward projecting portions 27.

As shown in FIG. 3, the drain case 3 is composed of a case main body 31 and a condensed water drain portion 32. The case main body 31 has front and rear side walls 31a and a bottom wall 31b connecting together the lower ends of the front and rear side walls 31a, and is opened upward so as to receive the second header tank 5 of the evaporator 2 with a cool storage function. The condensed water drain portion 32 drains the condensed water generated on the evaporator 2 from at least one of the lower edge of the outward projecting portion 24 of each cool storage material container 18 and the lower end of the outward projecting portion 27 of each outer fin 19.

A plurality of drain holes (through holes) 33 are formed in the bottom wall 31b of the case main body 31 of the drain case 3. The case main body 31 drains the condensed water which flows downward from the refrigerant flow tubes 15 of the evaporator 2 and the fin main body portions 26 of the outer fins 19 thereof onto the second header tank 5 and then drops through the unillustrated drain grooves and the drain holes 5a. The condensed water drain portion 32 is composed of a leeward projecting portion 34 which projects frontward from a vertically intermediate portion of the outer surface of the front side wall 31a of the case main body 31 and whose distal end is located below the front end of the outward projecting portion 27 of each outer fin 19; a first upward projecting portion 35 which extends upward from the front end of the leeward projecting portion 34; and a second upward projecting portion 36 which extends upward from the leeward projecting portion 34 at a position located slightly rearward of the first upward projecting portion 35. A plurality of drain holes 38 are formed in the leeward projecting portion 34 to be located between the two upward projecting portions 35 and 36, and a plurality of drain holes 39 are formed in the leeward projecting portion 34 to be located between the second upward projecting portion 36 and the front side end 31a of the case main body 31. Elastic members 37 formed of rubber or the like material are provided at the upper ends of the two upward projecting portions 35 and 36. The elastic member 37 of the first upward projecting portion 35 is in contact with the lower end of the outward projecting portion 27 of each outer fin 19, and the elastic member 37 of the second upward projecting portion 36 is in contact with the lower end of the outward projecting portion 24 of each cool storage material container 18 and the lower end of the outward projecting portion 27 of each outer fin 19. The first upward projecting portion 35 serves as a drawing portion for drawing condensed water from the lower end of the outward projecting portion 27 of each outer fin 19. The second upward projecting portion 36 serves as a drawing portion for drawing condensed water from the lower end of the outward projecting portion 24 of each cool storage material container 18 and the lower end of the outward projecting portion 27 of each outer fin 19. Accordingly, the condensed water drain portion 32 has the upward projecting portions 35 and 36 which serve as drawing portions for drawing condensed water from at least one of the lower end of the outward projecting portion 24 of each cool storage material container 18 and the lower end of the outward projecting portion 27 of each outer fin 19. No limitation is imposed on the number of the upward projecting portions 35 and 36.

Notably, the elastic members 37 of the two upward projecting portions 35 and 36 may be disposed such that the elastic members 37 are located in close proximity to the lower end of the outward projecting portion 24 of each cool storage material container 18 and the lower end of the outward projecting portion 27 of each outer fin 19, and gaps are formed between the elastic members 37 and the lower end of the outward projecting portion 24 of each cool storage material container 18 and the lower end of the outward projecting portion 27 of each outer fin 19. In such a case, preferably, the size of the gaps is 3 mm or less. Also, the elastic members 37 are not necessarily required, and the first and second upward projecting portions 35 and 36 may be disposed such that the first upward projecting portion 35 is in contact with or is in close proximity to the lower end of the outward projecting portion 27 of each outer fin 19, and the second upward projecting portion 36 is in contact with or is in close proximity to the lower end of the outward projecting portion 24 of each cool storage material container 18 and the lower end of the outward projecting portion 27 of each outer fin 19.

An air conditioning apparatus for a vehicle in which an engine serving as a drive source for a compressor is temporarily stopped when the vehicle is stopped is composed of a compressor, a condenser (refrigerant cooler) for cooling the refrigerant discharged from the compressor, an expansion valve (pressure-reducing unit) for reducing the pressure of the refrigerant having passed through the condenser, and the cooling unit 1. The evaporator 2 of the cooling unit 1 evaporates the refrigerant having passed through the expansion valve.

In the above-described air conditioning apparatus for a vehicle, when the compressor is operating, low pressure, two-phase refrigerant (a mixture of vapor refrigerant and liquid refrigerant) having been compressed by the compressor and having passed through the condenser and the expansion valve passes through the refrigerant inlet 9, and enters the leeward upper header section 7 of the evaporator 2. The refrigerant then passes through all the refrigerant flow tubes 15, and flows out from the refrigerant outlet 11 of the windward upper header section 8. When the refrigerant flows through the refrigerant flow tubes 15, the refrigerant performs heat exchange with air passing through the air-passing clearances 17, and flows out in a vapor phase.

At that time, the cool storage material within the container main body 23 of each cool storage material container 18 is cooled by the cool carried by the refrigerant flowing through the refrigerant flow tubes 15. Further, the cool carried by the cooled cool storage material within the container main body 23 is transferred through the inner fin 25 to the cool storage material within the outward projecting portion 24 of the cool storage material container 18, and the cool carried by air having passed through the air-passing clearances 17 and cooled by the refrigerant is transferred to the cool storage material within the outward projecting portion 24. As a result, the cool is stored in the entire cool storage material within the cool storage material container 18.

When the compressor operates, condensed water is generated on the surfaces of the refrigerant flow tubes 15, the cool storage material containers 18, and the outer fins 19 of the evaporator 2. The condensed water generated on the surfaces of the refrigerant flow tubes 15 and the fin main body portions 26 of the outer fins 19 flows downward onto the second header tank 12, and is guided by unillustrated guide portions so that the condensed water flows down through the unillustrated drain grooves and the drain holes 5*a*. The condensed water then drops on the bottom wall 31*b* of the case main body 31, and is drained through the drain holes 33. The condensed water generated on the outward projecting portions 24 of the cool storage material containers 18 and the outward projecting portions 27 of the outer fins 19 reach the respective lower ends of the outward projecting portions 24 and 27. Subsequently, by the capillary effect, the condensed water is drawn, through the elastic members 37, to the two upward projecting portions 35 and 36 of the condensed water drain portion 32. The condensed water then flows downward along the two upward projecting portions 35 and 36 onto the leeward projecting portion 34, and is drained downward through the drain holes 38 and 39.

When the compressor stops, the cool stored in the cool storage material within the container main body portion 23 and outward projecting portion 24 of each cool storage material container 18 is transferred, through the inner fin 25, to the left and right side walls of the container main body portion 23 and the outward projecting portion 24. The cool transferred to the left and right side walls of the container main body portion 23 passes through the corresponding refrigerant flow tubes 15, and is transferred, via the fin main body portions 26 of the outer fins 19 brazed to the refrigerant flow tubes 15, to air passing through the air-passing clearances 17 adjacently located on the opposite sides of the air-passing clearance 17 in which the cool storage material container 18 is disposed. The cool transferred to the left and right side walls of the outward projecting portion 24 is transferred, via the outward projection portions 27 of the outer fins 19 brazed to the left and right side surfaces of the outward projecting portion 24, to air passing through the air-passing clearances 17. Accordingly, even when the temperature of air having passed through the evaporator 2 increases, the air is cooled, so that a sharp drop in the cooling capacity can be prevented.

What is claimed is:

1. A cooling unit of an air conditioning apparatus for a vehicle, comprising:
    an evaporator with a cool storage function, and a drain case disposed below the evaporator,
    wherein
    the evaporator includes: an upper header tank and a lower header tank disposed apart from each other in a vertical direction; and a heat exchange core section provided between the upper and the lower header tanks,
    the upper header tank includes: a leeward upper header section; and a windward upper header section,
    the lower header tank includes: a leeward lower header section; and a windward lower header section,
    in the heat exchange core section, a plurality of paired tubes each composed of two refrigerant flow tubes spaced from each other in an air-passing direction are disposed at predetermined intervals in a longitudinal direction of the cooling unit,
    air-passing clearances are formed between each adjacent paired tubes,
    an upper end portion of each leeward refrigerant flow tube is connected to the leeward upper header section,
    a lower end portion of each leeward refrigerant flow tube is connected to the leeward lower header section,
    an upper end portion of each windward refrigerant flow tube is connected to the windward upper header section,
    a lower end portion of each windward refrigerant flow tube is connected to the windward lower header section,
    a cool storage material container filled with a cool storage material is disposed at one of the air-passing clearances, and extends over the leeward and windward refrigerant flow tubes disposed along the air-passing direction,
    corrugated outer fins are disposed at the other air-passing clearances which have no cool storage material container disposed, and extend over the leeward and windward refrigerant flow tubes disposed along the air-passing direction,
    the drain case includes a case main body which has a leeward-side and a windward-side side walls and a bottom wall connecting lower end portions of the side walls together, which is opened upward, and into which the lower header tank is fitted,
    further wherein
    each cool storage material container and each outer fin comprise an outward projecting portion which projects leeward from the refrigerant flow tubes,
    a condensed water drain portion is provided at a vertically intermediate portion of an outer surface of the leeward-side side wall of the case main body, and is composed of:
        a leeward projecting portion which projects leeward and which distal end is located below a leeward end of the outward projecting portion of each outer fin;
        a first upward projecting portion which extends upward from a leeward end of the leeward projecting portion; and a second upward projecting portion which extends upward from the leeward projecting portion at a position located slightly windward of the first upward projecting portion, a plurality of drain holes are formed in the leeward projecting portion located between the first and the second upward projecting portions, and another plurality of drain holes are formed in the leeward projecting portion located between the second upward projecting portion and the leeward-side side wall of the case main body, where the drain holes are through holes, an elastic member is provided at a top end of the first upward projecting portion and another elastic member is provided at a top end of the second upward projecting portion, the elastic member of the first upward projecting portion is in contact with a lower end of the outward projecting portion of each outer fin, the elastic member of the second upward projecting portion is in contact with a lower end of the outward projecting portion of each cool storage material container and the lower end of the outward projecting portion of each outer fin, the first upward projecting portion serves as a drawing portion drawing condensed water from the lower end of the outward projecting portion of each outer fin, and the second upward projecting portion serves as another drawing portion drawing condensed water from the lower end of the outward projecting portion of each cool storage material container and the lower end of the outward projecting portion of each outer fin.

2. A cooling unit of an air conditioning apparatus for a vehicle, comprising:

an evaporator with a cool storage function, and a drain case disposed below the evaporator, wherein the evaporator includes: an upper header tank and a lower header tank disposed apart from each other in a vertical direction; and a heat exchange core section provided between the upper and the lower header tanks, the upper header tank includes: a leeward upper header section; and a windward upper header section, the lower header tank includes: a leeward lower header section; and a windward lower header section, in the heat exchange core section, a plurality of paired tubes each composed of two refrigerant flow tubes spaced from each other in an air-passing direction are disposed at predetermined intervals in a longitudinal direction of the cooling unit, air-passing clearances are formed between each adjacent paired tubes, an upper end portion of each leeward refrigerant flow tube is connected to the leeward upper header section, a lower end portion of each leeward refrigerant flow tube is connected to the leeward lower header section, an upper end portion of each windward refrigerant flow tube is connected to the windward upper header section, a lower end portion of each windward refrigerant flow tube is connected to the windward lower header section, a cool storage material container filled with a cool storage material is disposed at one of the air-passing clearances, and extends over the leeward and windward refrigerant flow tubes disposed along the air-passing direction, corrugated outer fins are disposed at the other air-passing clearances which have no cool storage material container disposed, and extend over the leeward and windward refrigerant flow tubes disposed along the air-passing direction, the drain case includes a case main body which has a leeward-side and a windward-side side walls and a bottom wall connecting lower end portions of the side walls together, which is opened upward, and into which the lower header tank is fitted, further wherein each cool storage material container and each outer fin comprise an outward projecting portion which projects leeward from the refrigerant flow tubes, a condensed water drain portion is provided at a vertically intermediate portion of an outer surface of the leeward-side side wall of the case main body, and is composed of:

a leeward projecting portion which projects leeward and which distal end is located below a leeward end of the outward projecting portion of each outer fin;

a first upward projecting portion which extends upward from a leeward end of the leeward projecting portion; and a second upward projecting portion which extends upward from the leeward projecting portion at a position located slightly windward of the first upward projecting portion, a plurality of drain holes are formed in the leeward projecting portion located between the first and the second upward projecting portions, and another plurality of drain holes are formed in the leeward projecting portion located between the second upward projecting portion and the leeward-side side wall of the case main body, where the drain holes are through holes, a 3 mm or less gap is made between a top end of the first upward projecting portion and a lower end of the outward projecting portion of each outer fin, another 3 mm or less gap is made between a top end of the second upward projecting portion and a lower end of the outward projecting portion of each cool storage material container and between the top end of the second upward projecting portion and the lower end of the outward projecting portion of each outer fin, the first upward projecting portion serves as a drawing portion drawing condensed water from the lower end of the outward projecting portion of each outer fin, and the second upward projecting portion serves as another drawing portion drawing condensed water from the lower end of the outward projecting portion of each cool storage material container and the lower end of the outward projecting portion of each outer fin.

* * * * *